(12) United States Patent
Schwitters et al.

(10) Patent No.: US 9,886,031 B2
(45) Date of Patent: Feb. 6, 2018

(54) CONTROLLING OF THE AUTOMATIC DRIVING PROCESS OF A VEHICLE

(71) Applicant: Volkswagen Aktiengesellschaft, Wolfsburg (DE)

(72) Inventors: Frank Schwitters, Koenigslutter (DE); Claus-Peter Brueckner, Braunschweig (DE); Thorsten Rennekamp, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/454,209

(22) Filed: Aug. 7, 2014

(65) Prior Publication Data

US 2015/0045991 A1 Feb. 12, 2015

(30) Foreign Application Priority Data

Aug. 7, 2013 (DE) .................. 10 2013 215 598
Sep. 2, 2013 (DE) .................. 10 2013 217 445

(51) Int. Cl.
*G05D 1/00* (2006.01)
*B60W 30/00* (2006.01)
(Continued)

(52) U.S. Cl.
CPC .......... *G05D 1/0022* (2013.01); *B60W 30/00* (2013.01); *B60W 30/06* (2013.01); *B62D 15/0285* (2013.01); *B60R 25/00* (2013.01)

(58) Field of Classification Search
CPC ........ G06F 21/35; G06F 21/34; B60W 30/00; B60W 30/06; B62D 15/0285; B62D 15/025; B62D 15/027; B62D 1/28; B62D 1/283; G05D 1/0016; G05D 1/0022; G05D 1/0033; G05D 1/0055; G05D 1/0077
See application file for complete search history.

(56) References Cited

U.S. PATENT DOCUMENTS

2005/0037734 A1* 2/2005 Tanaka et al. ............... 455/411
2008/0143477 A1* 6/2008 Eichin ......................... 340/5.61
(Continued)

FOREIGN PATENT DOCUMENTS

CN 102096956 A 6/2011
DE 103 23 038 A1 2/2004
(Continued)

OTHER PUBLICATIONS

Liu; The impulse to apply new technology (New Technology Movement Impulse); Auto Business Review; pp. 86-87; dated Sep. 30, 2012.
Office Action from Chinese Patent Application No. 201410383691.8; dated Sep. 30, 2017.

*Primary Examiner* — Adam R Mott
(74) *Attorney, Agent, or Firm* — Barnes & Thornburg LLP

(57) ABSTRACT

A method to control an automatic driving process of a vehicle is provided. An authentication information is received via a first radio interface in the vehicle and a control information is received for the automatic driving process via a second radio interface different from the first radio interface in the vehicle. The automatic driving process is controlled as a function of the authentication information and the control information.

18 Claims, 2 Drawing Sheets

(51) Int. Cl.
*B62D 15/02* (2006.01)
*B60W 30/06* (2006.01)
*B60R 25/00* (2013.01)

(56) References Cited

U.S. PATENT DOCUMENTS

| | | | | |
|---|---|---|---|---|
| 2011/0102139 | A1* | 5/2011 | Girard, III | H04L 63/102 |
| | | | | 340/5.61 |
| 2012/0325905 | A1* | 12/2012 | Kim | 235/380 |
| 2014/0172197 | A1* | 6/2014 | Ganz | G08C 17/02 |
| | | | | 701/2 |
| 2014/0232523 | A1* | 8/2014 | Rantet | G07C 9/00111 |
| | | | | 340/5.61 |

FOREIGN PATENT DOCUMENTS

| | | | |
|---|---|---|---|
| DE | 10 2008 051 982 A1 | | 6/2009 |
| DE | 102008051982 A1 | * | 6/2009 |
| DE | 10 2009 041 587 A1 | | 3/2011 |
| DE | 10 2009 043 589 A1 | | 3/2011 |
| DE | 10 2009 051 463 A1 | | 5/2011 |
| DE | 20 2008 018 157 U1 | | 3/2012 |
| DE | 10 2012 007 984 A1 | | 3/2013 |
| DE | 102012200625 A1 | * | 7/2013 |
| EP | 1 043 205 A1 | | 10/2000 |
| EP | 2 316 709 A2 | | 5/2011 |
| FR | 2 807 238 A1 | | 10/2001 |
| GB | 2 414 323 A | | 11/2005 |

* cited by examiner

CONTROLLING OF THE AUTOMATIC DRIVING PROCESS OF A VEHICLE

This nonprovisional application claims priority under 35 U.S.C. § 119(a) to German Patent Application Nos. 10 2013 215 598.0, which was filed in Germany on Aug. 7, 2013, and to 10 2013 217 445.4, which was filed in Germany on Sep. 2, 2013, and which are herein incorporated by reference.

BACKGROUND OF THE INVENTION

Field of the Invention

The invention relates to a method for the control of an automatic driving process of a vehicle as well as a correspondent controlling device.

Description of the Background Art

Vehicles such as passenger cars or trucks are increasingly equipped with automatic driving functions. These automatic driving functions pertain, for instance, to an automatic braking of the vehicle in the event of danger, an automatic following distance to a vehicle ahead, an automatic staying-in-lane as well as an automatic maneuvering when parking the vehicle or pulling out of a parking space. Especially during the automatic maneuvering of the vehicle during parking it can be desirable not to have a driver in the vehicle, for instance when parking in or pulling out of a very narrow parking space where the driver would have difficulties to leave or enter the vehicle through the driver's door once it is parked. However, during automatic driving processes when no driver is in the vehicle, it is desirable to ensure that the driver is in close proximity to the vehicle to monitor the automatic driving process.

In this context, DE 10 2008 051 982 A1 discloses a method and a device for the remote controlled maneuvering of a vehicle. In a first operating step an immobilizer system is deactivated and a motor is started. In a second operating step the vehicle is decelerated via a service brake, a parking brake is released and a driving position is engaged in an automatic transmission. In a third operating step a vehicle speed is controlled via the service brake. Before and during the process it is constantly monitored that a driver is located within a predetermined maximum distance from the car. For instance, a communication link to a remote control to the vehicle can be permitted only within a predetermined maximum distance to the vehicle to ensure that such remote controlled maneuvering of the vehicle can take place only under the immediate supervision of the driver.

DE 10 2009 051 463 A1 relates to a method to perform the reversing of a vehicle out of a parking space. An external control device communicates with a control device in the vehicle, and the control device in the vehicle determines the location information of the driver by considering the communication. The control device in the vehicle controls the reversing of the vehicle out of the parking space by evaluating the location information.

DE 10 2009 043 589 A1 relates to a method to control a driver's assistance system of a vehicle via a remote control. The driver's assistance system and the remote control each have a transmitting and receiving unit. The communication between remote control and driver's assistance system is accomplished via electromagnetic waves. A sound logging of the run time of the electromagnetic waves between remote control and driver's assistance system is performed, and the distance between remote control and driver's assistance system is determined from the sound logging. If the distance between remote control and driver's assistance system is smaller than a predetermined maximum distance, a driver's assistance function of the driver's assistance system is activated by the remote control.

DE 10 2012 007 984 A1 relates to a method for the automatic maneuvering of a vehicle with a vehicle control device designed to emit control signals to a drive and steering device of the vehicle. A portable communication device is designed to receive an input made by an operator at the operating controls of the portable communication device to release a maneuvering process and, based on this input, to wirelessly transmit a command to the control device to initiate the maneuvering process. The operating controls of the portable communication device have an operating element, and the portable communication device is designed to initiate the maneuvering of the vehicle only for as long as the operator is using the operating element.

DE 20 2008 018 157 U1 relates to a garage assistant to assist in the parking of a vehicle in a garage. The parking process is visually transmittable to a mobile end device via a wireless interface.

DE 10 2009 041 587 A1 relates to a driver's assistance device enabling the driver of a vehicle to easily recognize a dangerous situation during an automatic parking process of the vehicle. A control device is designed to receive commands from a remote control and to stop an already begun parking process of a vehicle after receiving a predetermined stop command. At least one camera is coupled to the control device and obtains image data of a surrounding area of the vehicle. The control device sends signals to the remote control which include the image data obtained by the camera or image data calculated from them.

For a vehicle to pull out of a tight parking space or to park in a tight parking space without the driver being in the vehicle, a utilization of a remote control device makes sense. The reach of such a remote control device, for instance a wireless remote control or a mobile phone, however, can be relatively great, for example several 10 m or even more. This allows the possibility to perform the parking process even from this relatively great distance although it should be avoided for safety reasons to ensure that the driver does not operate the function by mistake and visually monitors the parking process.

SUMMARY OF THE INVENTION

It is therefore the object of the invention to ensure that an automatic driving process of the vehicle only takes place or is initiated when a driver or owner of the vehicle is present.

In accordance with an embodiment of the invention a method for the control of an automatic driving process is provided. In the method an authentication information is received via a first radio interface in the vehicle, and a control information for the automatic driving process via a second radio interface in the vehicle. The first and second radio interfaces are two different distinct radio interfaces in the vehicle. For instance the first radio interface can have a smaller range than the second radio interface. The automatic driving process is controlled as a function of the authentication information and the control information.

Via the analysis of the authentication information it can be ensured that the automatic driving process is controlled by an authorized person only. Due to the smaller range of the first radio interface it can also be ensured that the authorized person is located within a limited distance to the vehicle so that the automatic driving process is intended and monitored by the person. The controlling of the automatic driving process can, for instance, entail a starting of the automatic driving process. The starting can, for instance, only be permitted or released when the person is still within the range of the first radio interface or when the automatic driving process is started within a predetermined time after the authentication via the first radio interface.

In accordance with an embodiment, the first radio interface includes a radio interface of a radio frequency identification system of a keyless access system of the vehicle. Keyless access systems are also called "Keyless Entry and Start Systems" (KESSY). For such access systems the user of the vehicle has for instance a transponder which can transmit authentication information to the vehicle when it is located within a range of a corresponding radio interface of the vehicle. The range of the first radio interface can for instance be less than 10 m, but preferably less than 5 m, and even more preferable less than 2 m. This ensures that the authentication takes place when the vehicle user is located in the immediate vicinity of the vehicle, particularly within visual range. Thusly, an unintended or improper controlling of the automatic driving process can be effectively prevented.

The range of the second radio interface can for instance be at least 10 m, preferably at least 30 m, and even more preferable at least 50 m. Such ranges are advantageous, for instance, for radio remote controls of a vehicle to be able to lock or unlock the vehicle even from a greater distance. Since the vehicle usually transmits light signals or acoustic signals upon locking or unlocking, this can be used to the vehicle user's advantage to be able to find the vehicle with greater ease, for example in a parking garage. The control of the automatic driving process via the second radio interface allows the user to remove himself from the vehicle during the automatic driving in such a manner that he is outside of the danger zone of the vehicle and, with that, does not hamper the automatic driving process and is not jeopardized himself. As previously described, the second radio interface can, for instance, include a remote control of the vehicle to remotely lock, unlock, open or close doors or windows of the vehicle. In addition, the second radio interface can also include, for instance, a mobile radio interface between, for example, a user's mobile phone and the vehicle. By means of a corresponding application installed in the mobile phone the automatic driving process can be controlled via the mobile phone after the authentication.

According to another embodiment, an operation of a control element on the outside of the vehicle or an approach to a proximity sensor on the outside of the vehicle is captured in the method, and the automatic driving process is controlled additionally as a function of this registration. The operating element can, for example, include a touch-sensitive contact on a door handle of the vehicle or on a handle of the trunk or hatchback of the vehicle. This ensures that the automatic driving process can be initiated only when the user is located in such a proximity to the vehicle that he can operate a corresponding handle or triggers the proximity sensor. In addition, the first radio interface can be activated, for instance, by operating the door handle or the handle of the trunk lid resp. the hatchback to receive the authentication information. This can minimize the energy consumption of the parked vehicle. Alternatively or in addition the approach to the proximity sensor on the outside of the vehicle can be captured and the first radio interface can be activated as a function of this approach. Also, as an alternative or an addition, a signal to unlock the vehicle can be received via the second radio interface and the first radio interface can be activated as a function of receiving this signal.

In another embodiment, the control information is transmitted from a vehicle-external device, for instance a radio remote control or a mobile phone or smart phone, to the vehicle. At least two operating elements are provided on the vehicle-external device which must be operated by the vehicle user in a predetermined sequence to transmit the control information from the vehicle-external device to the vehicle. By having to activate the operating elements in the predetermined sequence, an unintended activation of the automatic driving process can be effectively avoided. For example, it might be necessary to activate a first one of the two operating elements once, and within a predetermined time to activate a second one of the two operating elements successively to start the automatic driving process. In addition, it might be necessary to continuously activate one of the two operating elements or another operating element to execute the automatic driving process. In other words, the automatic driving process is automatically cancelled as soon as the operating element to be activated continuously is no longer activated. This permits to intuitively and quickly interrupt the automatic driving process, for example, in emergency situations.

In another embodiment, a time is determined between receiving the authentication information and receiving the control information. The automatic driving process is additionally controlled as a function of the determined time period. For instance, it can be arranged that the automatic driving process is started only when the time period between receiving the authentication information and receiving the control information to start the automatic driving process does not exceed a maximum predetermined time period, for example, does not take any longer than three or ten seconds. This enables the user to remove himself to a safe distance from the vehicle after the authentication and then to start the automatic driving process. Due to the limited time period the distance between user and vehicle is restricted so that it can be ensured that the driver is still within a visual distance to the vehicle when starting the automatic driving process and, with that, is able to visually monitor the automatic driving process.

According to an embodiment the invention a control device is also provided for the vehicle. The control device is comprised of a first radio interface to receive the authentication information and a second radio interface to receive a control information for an automatic driving process of the vehicle. The first radio interface and the second radio interface are different radio interfaces. The control device also includes a processing device designed to control the automatic driving process as a function of the authentication information and the control information. With that, the control device is able to perform the previously described process and its embodiments and therefore also encompasses the previously described advantages.

According to an embodiment of the invention, a vehicle with the previously described control device is provided. Together with corresponding radio transmitters which can be operable independently of the vehicle and can be taken along by the user of the vehicle, the user can authenticate himself to the vehicle and initiate an automatic driving process. It can be ensured that the user, at least during the initiation of the automatic driving process, is located within a predetermined distance to the vehicle, preferably within visual range of the vehicle to monitor the automatic driving process.

Further scope of applicability of the present invention will become apparent from the detailed description given hereinafter. However, it should be understood that the detailed description and specific examples, while indicating preferred embodiments of the invention, are given by way of illustration only, since various changes, combinations of one or all embodiments, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
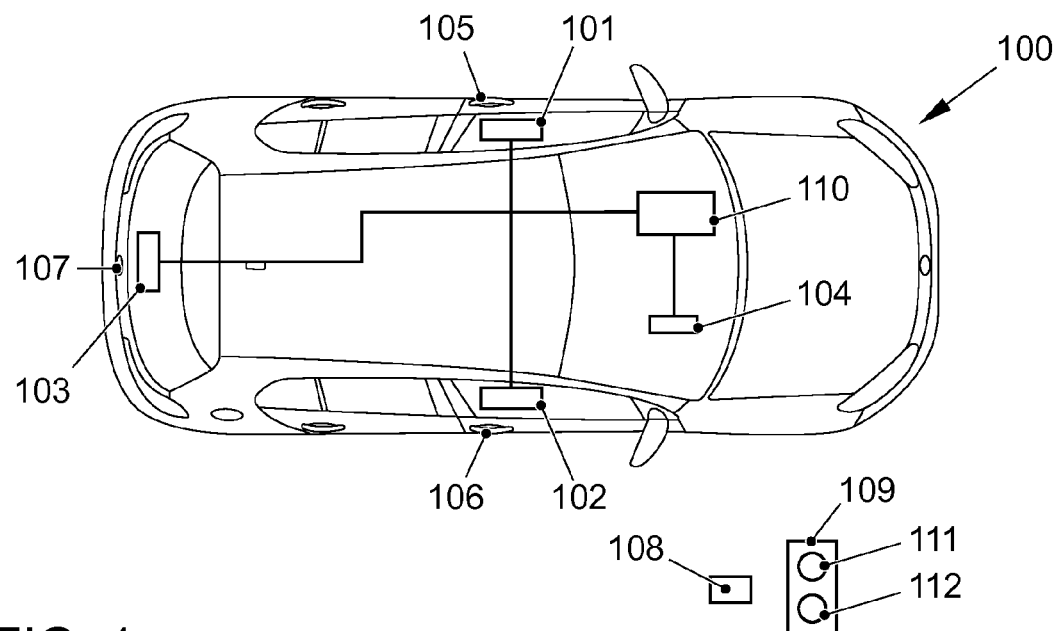
FIG. 1 shows a diagram of a vehicle according to an embodiment of the invention.

FIG. 1 shows a vehicle 100 with a control device to control an automatic driving process of the vehicle 100. The control device is comprised of a first radio interface to receive an authentication information. The first radio interface is, for example, a radio interface of a radio frequency identification system of a keyless access system of vehicle 100 and has three receiving aerials 101, 102 and 103, which are arranged on a driver's side door, a passenger door, resp. a hatchback of the vehicle 100. Another (not shown) fourth receiving aerial can be mounted in the front end of the vehicle 100. A user of the vehicle has a matching authentication device 108, for example in the form of a transponder which, for example, can be integrated in a car key or which is designed as a key chain or chip card. The control device also includes a second radio interface 104, which is designed to receive a control information for the automatic driving process. The second radio interface 104, for example, is a receiver for a remote control 109 of the vehicle containing various operating elements 111, 112. Alternatively or additionally, the second radio interface 104 can be a radio interface for a mobile phone, particularly a so called smart phone, which can have corresponding operating elements 111, 112 via a corresponding application similar to the remote control 109. The vehicle 100 also has a door handle 105 on the driver's door, another door handle 106 on the passenger door and a corresponding handle 107 on the hatchback. The handles 105, 106 and/or 107 can each be assigned a corresponding proximity sensor, which is able to determine an approach of a body part of the user and to send a corresponding proximity signal when the body part is within a certain distance to the proximity sensor resp. the handle, for example within 20, 30 or 50 cm. A locking system of the vehicle 100 (not shown in FIG. 1) can for instance be designed to switch on the first radio interface based on the touching of one of the handles 105-107 or an approach to one of the handles and, with that, to activate the aerials 101-103. Alternatively or in addition the first radio interface together with the receiving aerials 101-103 and, if applicable, the fourth receiving aerial in the front of the vehicle, can be activated if a signal to unlock the vehicle 100 is received via the second radio interface 104. If the transponder 108 is located within the radio range of one of the aerials 101-103 or the fourth receiving aerial in the front, the vehicle can receive a corresponding authentication information from the transponder 108 and can, for instance, unlock the doors and the hatchback of the vehicle 100. An access system of this kind is also referred to as Keyless Entry and Start System, or KESSY for short. The control device for the control of the automatic driving process also includes a processing device 110 coupled to the first radio interface and the second radio interface 104. The processing device 110 is designed to control the automatic driving process of the vehicle 100 as a function of the authentication information received via the first radio interface and the control information received via the second radio interface 104.

Figure 2:
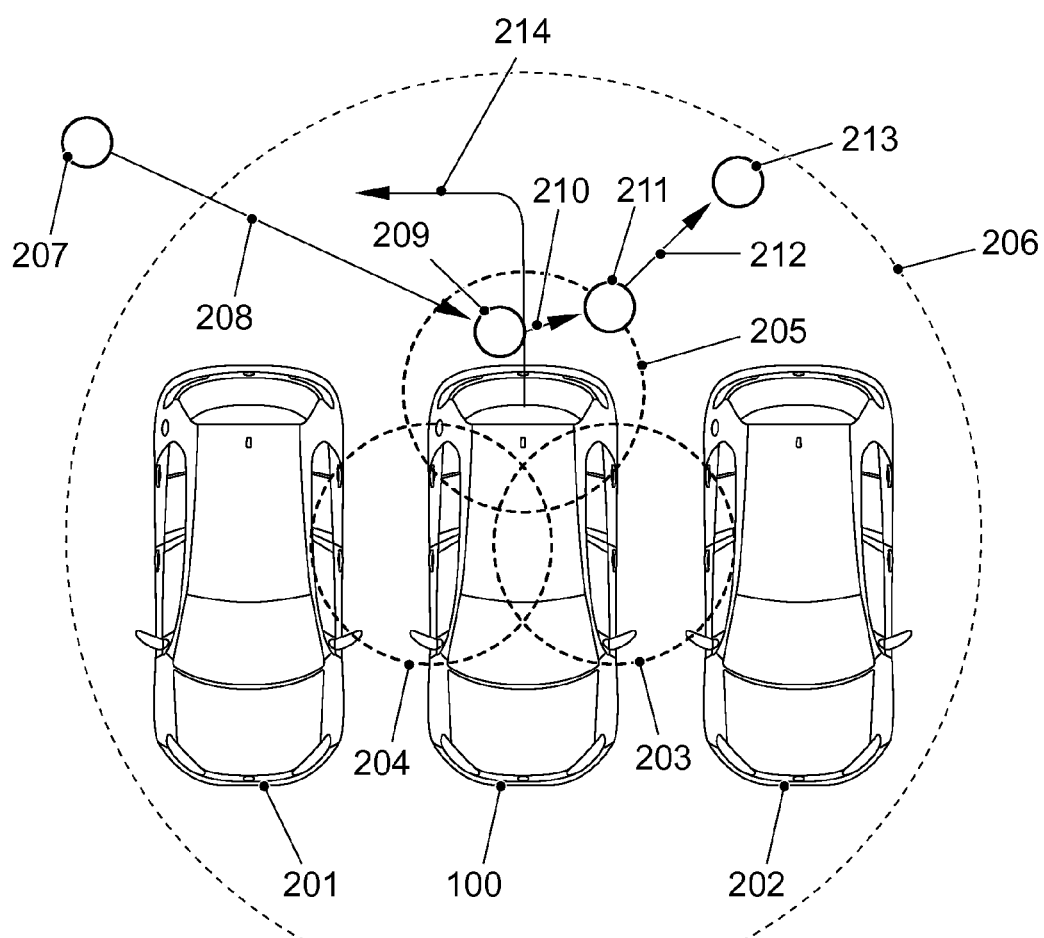
FIG. 2 shows a diagram of the vehicle of FIG. 1 during the initiation of an automatic driving process.
Figure 3:
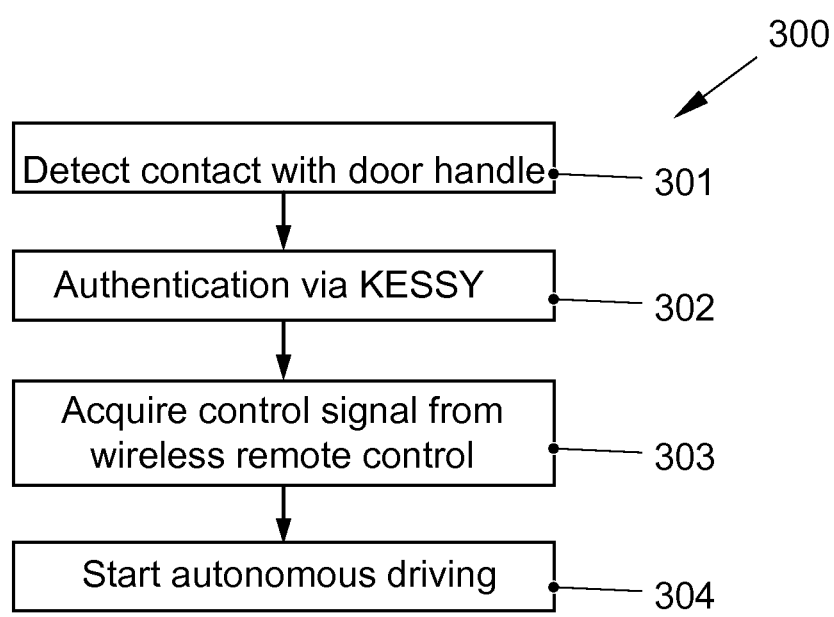
FIG. 3 shows a diagram of a method to control an automatic driving process of a vehicle in accordance with an embodiment of the invention.

The control of the automatic driving process is described in detail in the following, referencing FIGS. 2 and 3. In FIG. 2 the vehicle 100 is shown parked between two other vehicles 201 and 202. Due to the small distances between the vehicle 201, 100 and 202 a user wants to pull the vehicle 100 automatically out of the parking space to make the accessing of the vehicle easier once it has left the parking space. The dotted circles show a diagram of the radio range of the first and second radio interfaces of the vehicle 100. The circle 203 marks the range of the first radio interface based on the aerial 101. The circle 204 marks the range of the first radio interface based on the aerial 102 and the circle 205 schematically marks the range of the first radio interface based on the aerial 103. The circle 206 marks the range of the second radio interface 104. As can be seen in FIG. 2, the range of the first radio interface is substantially less than the range of the second radio interface. For instance, the range of the first radio interface can be less than 10 m. Preferably, the range of the first radio interface is less than 5 m and even more preferable a maximum of 2 m. The range of the second radio interface, however, is at least 10 m, preferably 30 m and even more preferable 50 m.

Initially the user of the vehicle 100 is outside of the range of the second radio interface in a position 207 and approaches the vehicle 100. Since accessing the doors of the vehicle 100 is very difficult due to the adjacent vehicles 201 and 202, the user moves to a position 209 behind the vehicle 100, as indicated by the arrow 208. In position 209 he is within the range of the first radio interface, i.e., within the circle 205. The user is carrying the transponder 108 with him. Through the proximity to the handle 107 or the touching of handle 107 on the hatchback of the vehicle 100, the first radio interface of the vehicle 100 is activated and an authentication information is requested by the transponder 108 via the aerial 103, thereby showing the user's authorization to the vehicle. This causes the control 110 to switch to a mode permitting the remote controlled parking, for instance, via the remote radio control 109 or with the aid of a cellular phone. For example, the user continues to move along the arrow 210 to position 211. If the user now operates the operating elements 111, 112 of the remote radio control 109 or the cellular phone in a certain sequence, the antitheft device of the vehicle 100 will be unlocked and the vehicle 100 can be driven out of the parking space with the aid of the remote radio control 109. The user moves from the position 211 along the arrow 212 to the position 213 in order not to hamper the automatic reversing out of the parking space. After starting the automatic driving, the automatic driving can be continued via corresponding operating elements of the remote control 109 so that the vehicle 100 moves along the trajectory 214 out of the parking space. Ultimately, the user has easy access to the vehicle 100 and the automatic driving process can be terminated.

FIG. 3 again shows diagrams of the previously described steps. Step 301 for method 300 initially captures an approximation to the door handle or a touching of the door handle 105-107. Then the first radio interface is activated, and an authentication of the user takes place in step 302 via, for example, a KESSY-System. The processing device 110 of the vehicle 100 then switches to a mode allowing the remote controlled parking via radio remote control 109 or via cellular phone. Thusly a corresponding control signal can be captured by the radio remote control 109 in the vehicle 100 in step 303, and the automatic driving can be started in step 304.

Although the previously described method was described in connection with the pulling out of a parking space of the vehicle 100 between the vehicles 201 and 202, the previously described method can also be used to park the vehicle 100 in a corresponding parking space. The previously described method can also be used to park or reverse a vehicle 100 out of a parking space for example in a garage or a parking space in the street. The authentication of the user can also take place via the (not shown) receiving aerial in the front of the vehicle. For instance, the first radio interface can be activated by operating the radio remote control 109. This allows the user to initiate the automatic pulling out of a parking space when he is located at the front of the vehicle that was backed into the parking space.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to control an automatic driving process of a vehicle, the method comprising:
   receiving, from a first mobile device, an authentication information via a first radio interface in the vehicle, the first radio interface including at least one first receiver mounted in the vehicle;
   subsequently receiving a control information for the automatic driving process via a second radio interface, which is different from the first radio interface in the vehicle, the second radio interface including a second receiver being arranged in the vehicle;
   determining a time period between the receipt of the authentication information by the first radio interface and the subsequent receipt of the control information by the second radio interface; and
   enabling control of the automatic driving process as a function of the received authentication information and the received control information, in response to a determination that the determined time period between receipt of the authentication information and the control information is shorter than a maximum predetermined time period.

2. The method according to claim 1, wherein the first radio interface has a smaller range than the second radio interface.

3. The method according to claim 1, wherein the first radio interface includes a radio interface of a radio frequency identification system of a keyless access system of the vehicle.

4. The method according to claim 1, wherein a range of the first radio interface is less than 10 m, less than 5 m, or less than 2 m.

5. The method according to claim 1, wherein the range of the second radio interface is at least 10 m, at least 30 m, or at least 50 m.

6. The method according to claim 1, further comprising:
   determining a distance between a user of the vehicle and the vehicle by capturing a distance to a proximity sensor on an exterior of the vehicle;
   capturing an operation of an operating element on the exterior of the vehicle, or receiving a signal to unlock the vehicle via the second radio interface; and
   activating the first radio interface as a function of the determined distance between the user of the vehicle and the vehicle.

7. The method according to claim 1, wherein the transmission of the control information is transmitted from a second mobile device to the vehicle with at least two operating elements provided on the second mobile device, wherein the transmission of the control information from the second mobile device to the vehicle requires operation of the at least two operating elements by a user of the vehicle in a predetermined sequence.

8. The method according to claim 1, wherein the first radio interface includes at least four first receivers mounted in the vehicle, each first receiver comprising an aerial antenna.

9. The method according to claim 1, wherein the automatic driving process automatically parks the vehicle or reverses the vehicle out of a parking position.

10. The method according to claim 1, further comprising switching a mode of the automatic driving process to a remote parking mode in response to authentication of the authentication information received at the first radio interface.

11. The method according to claim 1, further comprising processing of the control information received by the second radio interface by the processing device within the predetermined time period in response to authentication of the authentication information received via the first radio interface by the processing device, wherein the control information includes a command for the automatic driving process to be performed by the vehicle without requiring further authorization via the first interface.

12. The method according to claim 1, further comprising processing control information received by the second radio interface during the predetermined time period by a processing device in the vehicle to control the automatic driving process in response to receipt and authentication of the authentication information by the processing device.

13. The method according to claim 1, wherein the first mobile device is a keyless entry device, and wherein the second mobile device is a cellphone or a remote control.

14. A control device for a vehicle, the control device comprising:
   a first radio interface adapted to receive an authentication information from a first mobile device, the first radio interface including at least one first receiver mounted in the vehicle;
   a second radio interface that is different from the first radio interface and adapted to subsequently receive a control information for an automatic driving process of the vehicle, the second radio interface including a second receiver arranged in the vehicle; and
   a processing device, connected to the first radio interface and the second radio interface, adapted to determine a time period between the receipt of the authentication information by the first radio interface and the subsequent receipt of the control information and, control enablement of the automatic driving process as a function of the received authentication information and the received control information in response to a determination that the determined time period being shorter than a maximum predetermined time period.

15. The control device according to claim 14, the processing device is switched to a remote parking mode in response to receipt of the authentication information at the first radio interface.

16. The control device according to claim 15, wherein, while the processing device is in the remote parking mode, the processing device receives and processes the control information.

17. The method according to claim 11, wherein the at least one receiver of the first radio interface includes a radio proximity sensor provided in a door handle of the vehicle.

18. The control device according to claim 14, wherein the at least one first receiver includes three first receivers mounted around an outside surface of the vehicle.

* * * * *